Figure 1:
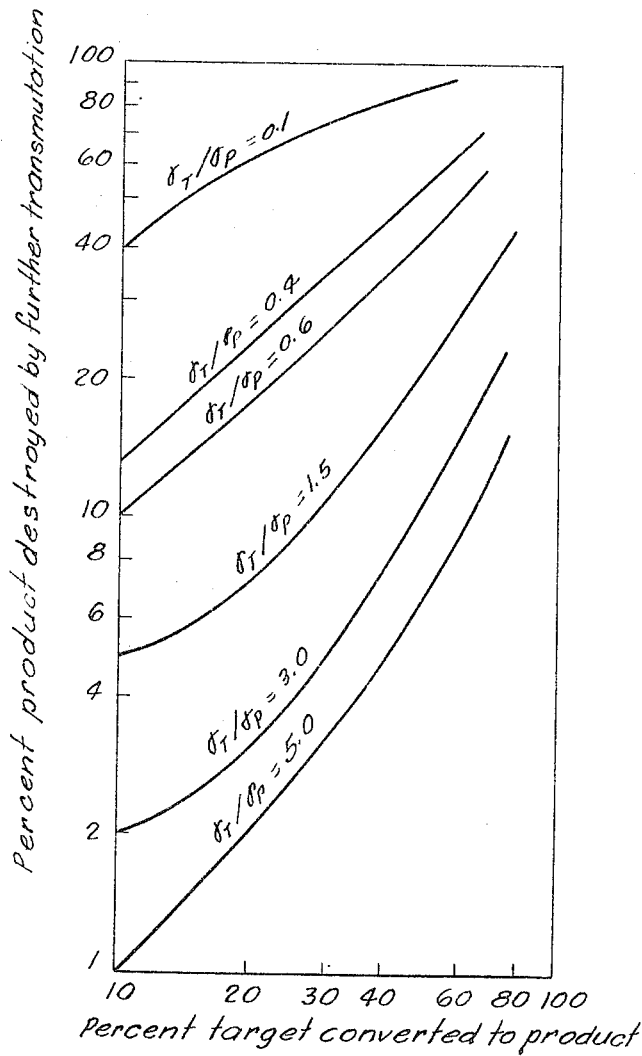

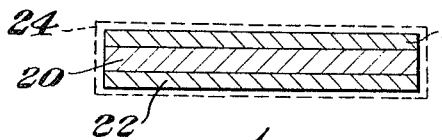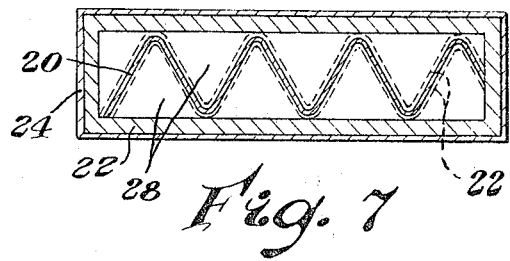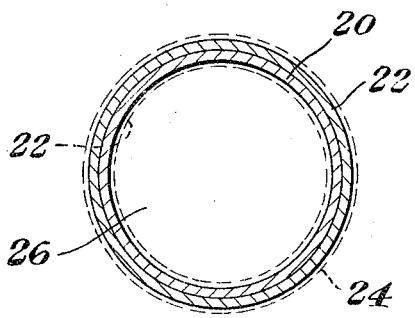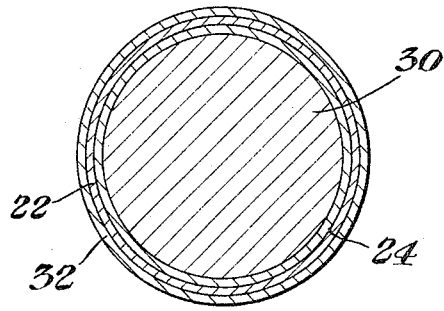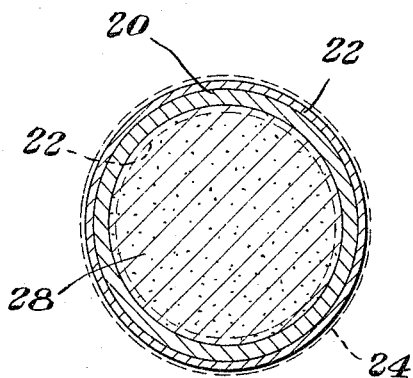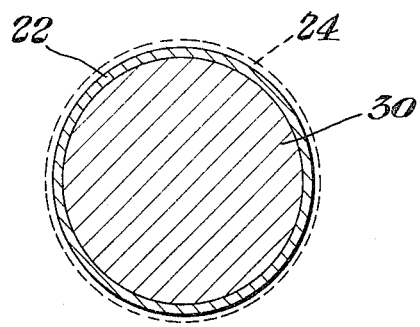
INVENTORS.
Jackson A. Ransohoff
Phillip M. Wood
BY C. Kenneth Bjork
AGENT

United States Patent Office 3,269,915
Patented August 30, 1966

3,269,915
NEUTRON IRRADIATION PROCESS FOR PRODUCING RADIOISOTOPES WHEREIN TARGET ISOTOPE IS SHIELDED FROM THERMAL NEUTRONS
Jackson A. Ransohoff and Phillip M. Wood, Washington, D.C., assignors to Neutron Products, Inc., Washington, D.C., a corporation of Delaware
Filed July 5, 1963, Ser. No. 292,917
8 Claims. (Cl. 176—16)

This invention relates to the preparation of nuclear isotopes and more particularly is concerned with a novel process for changing the relative effective cross sections of target and product isotopes. More specifically the present invention relates to improved methods of producing Pu-238 and Ac-227, which are useful as sources of alpha particles and heat energy for isotopic power devices, and Au-198 and Ta-182.

One conventional technique for producing radioisotopes comprises the subjection of an appropriate target material to neutron bombardment in a nuclear reactor. To illustrate, some useful isotopes such as Au-198 may be produced directly upon neutron capture in their precursor in accordance with the equation (1) 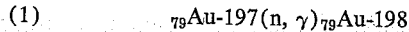$_{79}$Au-197(n, $\gamma$)$_{79}$Au-198

Some others, such as Pu-238 and Ac-227, for example, are produced by the beta decay of a relatively short lived isotope resulting from capture of a neutron in the immediately lower numbered isotope of a different element as follows:

(2) 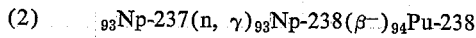$_{93}$Np-237(n, $\gamma$)$_{93}$Np-238($\beta^-$)$_{94}$Pu-238

(3) 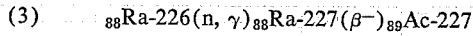$_{88}$Ra-226(n, $\gamma$)$_{88}$Ra-227($\beta^-$)$_{89}$Ac-227

As long as they remain in a field of neutron flux, the products of such neutron interactions become targets for transmutation to higher isotopes, either of the same element, or of a different element. Thus for example, Ac-227 produced from Ra-226 irradiation, as shown directly hereinbefore is also a target material for the production of Th-228 according to the reaction:

(4) 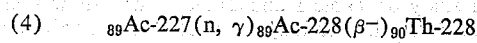$_{89}$Ac-227(n, $\gamma$)$_{89}$Ac-228($\beta^-$)$_{90}$Th-228

Pu-238 becomes a target for the production of Pu-239 as shown in Equation 5;

(5) 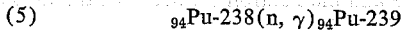$_{94}$Pu-238(n, $\gamma$)$_{94}$Pu-239 and Au-198 acts as a target for the production of Au-199 in competition with its decay to Hg-198;

(6) 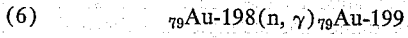$_{79}$Au-198(n, $\gamma$)$_{79}$Au-199

The degree of further transmutation of a long lived product, i.e., one whose half life is long compared to the period of irradiation, during the course of any given irradiation depends upon the fraction of target converted to product and the ratio of the effective neutron capture cross sections of target and product as shown in FIG. 1. The further transmutation of a short-lived product, one whose half life is similar to or short when compared with the period of irradiation, is principally dependent upon the ratio of the effective cross sections of target and product, the magnitude of the flux, and the half life of the product. In general, the lower the target-to-product cross section ratio ($\sigma_t/\sigma_p$) the greater is the destruction of product by further neutron capture for a given degree of target conversion. The significant loss of product through further transmutation is most serious if the result of further transmutation is deleterious to product quality as well as wasteful of product. Within established art, excessive product transmutation can be prevented simply by limiting the fraction of target converted to product during the course of a particular irradiation. Limitation of excessive product transmutation by this technique requires either the irradiation and continuous or semi-continuous processing of target as a solution or slurry or the frequent processing and refabrication of solid targets. Either alternative is costly and involves significant target out-of-pile time.

It is a principal object of the present invention to provide an irradiation process whereby it is practical to convert a larger fraction of a predetermined target isotope to a predetermined product in a single irradiation than by prior art techniques.

It is another object of the present invention to provide a process for preparing predetermined radioisotopes in good yield by neutron absorption in appropriate targets whereby the detrimental loss of product due to subsequent transmutation during the irradiation is substantially decreased from that which would be experienced using prior art processes.

It is a particular object of the present invention to provide an improved process for the production of radioisotopes having neutron reaction cross sections which are appreciable, in convenient neutron flux spectra, when compared to those of their target isotopes, whereby the product loss, due either to fission or transmutation, by reaction with neutrons during the course of irradiation is substantially decreased.

Specifically, it is an object of the present invention to provide an improved process for the production of Pu-238, Ac-227, Au-198 and Ta-182.

These and other objects and advantages will become apparent from the detailed description presented hereinafter along with the drawing. In the figures of the drawing, like components in the different figures are identified by the same numerals.

In the drawing:
FIGURE 1 is a graph showing the relationship between the ratio of target-to-product neutron cross section, the degree of target conversion to product, and the degree of product transmutation;

FIGURES 2, 3, 4, 5, 6 and 7 are cross sectional views of certain embodiments of target configurations suitable for use in carrying out the present process.

In accordance with the process of the present invention, during irradiation of a target material for producing a product isotope, the target material is shielded from neutrons of energy levels which are more readily absorbed by the product of transmutation rather than the target atoms thereby to decrease the possibility of capture of such neutrons by said product produced by neutron interaction with said target. In actual operation this is accomplished by the judicious use, as protective material, of other nuclides which have the ability to remove a significant number of neutrons which would otherwise be captured in the product but which do not at the same time remove a detrimental quantity of the neutrons which must be absorbed in the target to efficiently produce the irradiation product.

In order to appreciate the teachings of the present invention, it is helpful to consider briefly the energy distribution among the neutrons of a moderated nuclear reactor and the neutron absorbing properties of heavy isotopes in general, and of Np-237, Np-238, Pu-238, Ra-226, Ac-227, Au-197, Au-198, Ta-181- and Ta-182 in particular.

The neutrons produced by fission initially have a high energy, i.e. in the millions of electron volts (mev.). As these neutrons collide with other materials in the reactor, they are either captured, scattered elastically, or decreased in energy until they reach thermal energy, an energy corresponding to the temperature of the moderator, usually on the order of a few hundredths of an electron volt. The fraction of neutrons at any particular energy between several mev. and thermal is characteristic for each reactor and is a function of the materials used in the system, the geometry of the system, and the ratio of fuel to moderator. In general, the rate of transmutation of any particular nuclide in a given reactor neutron spectrum is defined by the relationship:

(7) $-dN/dt = N(\sigma_0\phi_0 + \sigma_1\phi_1 + \sigma_2\phi_2 + \sigma_3\phi_3 \ldots + \sigma_n\phi_n$ where:

N is the number of atoms of nuclide,
$t$ is the time in seconds, tremely high cross sections at their peak, and accordingly they may be highly self shielding for appreciable target surface densities.

Estimated resonance and nonresonance cross section values, for various neutron energy groups in the thermal and epithermal regions, are shown in Table I, based upon data available at the time the calculations were performed, for nuclides which are immediately important to the teaching of the present invention. In Table II are shown some estimated self shielding factors for several important resonances as a function of target nuclide concentration.

TABLE I.—NEUTRON ABSORPTION CROSS SECTIONS FOR CERTAIN ISOTOPES

| Neutron Energy Group | Np-237 | Np-238 | Pu-238 | Au-197 | Au-198 | Ra-226 | Ac-227 | Ta-181 | Ta-182 |
|---|---|---|---|---|---|---|---|---|---|
| .025–.068 ev | 140 b | ~1600 b | 450 b | 80 b | ~25,000 b | 18 b | ~800 b | 20 | ~17,000 b. |
| .068–.184 | 90 | No data | 220 | 55 | No data | 10 | No data | 15 | No data. |
| .184–.50 | 60+135*f | do | 100 | 40 | do | 8+120*f | do | 12 | Do. |
| .50–1.3 | 50+135*f | do | 50 | 30 | do | 6+175*f | do | 10 | Do. |
| 1.3–3.5 | 80+120 f | do | 25+33 f | 40 | do | 4 | do | 12 | Do. |
| 3.5–9.5 | ~100 f | do | 15+8 f | 25+1150 f | do | 1 | do | 370 f | Do. |
| 9.5–26 | ~50 f | do | 6+17 f | 15 | do | No data | do | 110 f | Do. |
| 26–90 | No data | do | No data | 10+35 f | do | do | do | 78 f | Do. |
| 70–190 | do | do | do | 30 | do | do | do | 35 f | Do. | f is the weighted self shielding factor for the resonances in each group (see Table II).
*Single resonance divided between two groups.

TABLE II.—ESTIMATED SELF SHIELDING FACTORS FOR SOME IMPORTANT RESONANCES AS A FUNCTION OF TARGET NUCLIDE SURFACE DENSITY [1]

| Neutron Energy Group from Table I | Neutron Energy at Resonance Peak | Np-237 Surface Density, gms./cm.² | | | Ra-226 Surface Density gms./cm.² | | | Au-197 Surface Density gms./cm.² | | |
|---|---|---|---|---|---|---|---|---|---|---|
| | | .05 | .1 | .3 | .05 | .1 | .3 | .05 | .1 | .3 |
| 0.184–0.50 | .489 | .87 | .81 | .65 | | | | | | |
| 0.50–1.3 ev | .54 | | | | .84 | .77 | .55 | | | |
| 1.3–3.5 ev | 1.48 | .85 | .78 | .57 | | | | | | |
| 3.5–9.5 ev | 3.89 | .88 | .81 | .66 | | | | | | |
| | 4.9 | | | | | | | .58 | .39 | .2 |
| | 5.82 | .83 | .75 | .51 | | | | | | |
| | 7.47 | .95 | .92 | .82 | | | | | | |
| | 9.38 | .92 | .86 | .74 | | | | | | |

[1] Gms. nuclide/cm.² of normal target area for slab geometry.

Each subscript (0, 1, 2, 3, ... n) represents an energy group of neutrons between thermal and fisson energy,
$\sigma_{0,1,2,3,\ldots n}$ is the effective cross section, in cm.², of the nuclide at the neutron energy represented by the particular subscript, and
$\phi_{0,1,2,3,\ldots n}$ is the neutron flux in the energy group represented by the particular subscript, in n/cm.² sec.

For many isotopes, the cross section varies with neutron energy approximately as the inverse of the neutron velocity; when combined with a temperature factor and a constant representing the deviation of the cross section from a 1/v. relationship, the 2200 m./sec. (.025 e.v.) cross section is frequently used is express the non-resonance cross section of any particular nuclide. In addition, almost all the heavy nuclides have neutron capture resonances which are spaced more or less predictably as a function of neutron energy and the composition of the nucleus. Nuclei with even numbers of neutrons and protons generally exhibit the widest spacing between resonacnes, and those with odd numbers of both neutrons and protons the narrowest. Particularly in less well moderated reactors, which have a large fraction of epithermal and intermediate energy neutrons, these resonances contribute significantly to the total effective cross section.

Although any number of resonances may be important, one or a few of the resonances frequently are dominant in determining the effective cross section of a particular nuclide in a given neutron energy spectrum. Furthermore, most major neutron capture resonances have ex- Careful study of Table I and Table II will show that for any particular irradiation, the relative effective cross sections of target and product will depend not only upon nuclide properties, but also upon the surface density of the target nuclide and the neutron spectrum of the target irradiation zone.

To illustrate, consider specifically the production of Pu-238 by the irradiation of Np-237. In a very well moderated reactor, such as the Materials Test Reactor (MTR) at Arco, Idaho, for example, the thermal cross sections are most important. It is estimated that for a target of reasonable thickness, say 0.3 gms. Np-237/cm.², the effective Np-237 cross section in terms of thermal flux would be approximately 190 barns (b), 170 barns for the 1/v. component, and 20 barns for the resonance contributions. For Pu-238 in such a spectrum, it is estimated that the effective 1/v. cross section would be equivalent to about 530 barns and the effect of epithermal resonances would be negligible. Thus for this particular case, the target-to-product cross section ratio would be about 0.35 and the conversion of a large fraction of the target to product would result in the further transmutation of an inordinate fraction of product, as can be seen by further reference to FIGURE 1. It is important to note further than a single irradiation, such as described directly hereinbefore, for the conversion of about 40%, for example of Np-237 to Pu-238 would be wasteful, not only in terms of target material and neutrons, but product purity would suffer as well.

Similarly, in the irradiation of Ra-226 to produce

Ac-227, product transmutation is even more severe, the target-to-product cross section ratio being even lower than for the Np-237—Pu-238 system. Table III lists critical data based on calculations by Grove et al. (MLM 747, "Actinium-227 and Thorium 228 Production as a Function of Time for Various Values of Neutron Flux," G. R. Grove, L. N. Russell, and S. R. Orr, August 1952), for the irradiation of a Ra-226 target in the same reactor.

TABLE III

| Integrated flux, nvt. | Atoms Ac-227 per initial atom Radium-226 | Percent transmutation of Ac-227 produced |
|---|---|---|
| $10^{21}$ | .0095 | 20 |
| $5 \times 10^{21}$ | .022 | 63 |
| $10^{22}$ | .023 | 80 |

Thus the above table shows that the production of Ac-227 as considered by Grove et al. supra, becomes asymptotic at a yield of approximately .023 atom of Actinium-227 per initial atom of Radium-226, and even this yield is achieved only at the expense of the loss, through further transmutation, of the majority of the Ac-227 produced.

The MTR is a highly thermalized low temperature reactor, and thus in the particular cases cited herein has a neutron spectrum which does not favor the target (vis-a-vis the product) cross section. If the irradiation processes were performed in a higher temperature, less well moderated reactor such as the Yankee Power Reactor at Rowe, Mass., using its 1962 core, the ratio of target-to-product cross sections would be expected to be somewhat improved—from 0.35 to about 0.5 in the Np-237—Pu-238 system and probably more substantially for the Ra-226—Ac-227 system. This would result in slightly improved product yields.

Furthermore, if the irradiation of Np-237 or Ra-226 were performed in a reactor having a high ratio of epithermal to thermal neutrons, so as to take maximum advantage of the resonance absorbing characteristics, the target-to-product cross section ratio could be increased to a value on the order of 1.0 or more for the Np-237—Pu-238 system and, to some higher value (than for the thermal reactor) for the Ra-226—Ac-227 irradiation. As can be seen from FIGURE 1, the irradiation of these materials under such conditions would measurably improve product yields for any given degree of product conversion. However, such yields still do not compare with those which can be achieved by practice of the present novel inventive process.

In the application of the present invention to the production of Pu-238 from Np-237 in accordance with the present process, the prevention of thermal neutron captures by the product is effected. The cross section of Np-237, the target, as has been shown hereinbefore, consists of a substantial nonresonance component, and a number of important resonances in the e.v. region; Pu-238, on the other hand, has a high thermal cross section, apparently due to a negative energy resonance, and a few relatively unimportant epithermal resonances. Thus, by shielding the target material so as to prevent the capture of thermal neutrons in both target and product, the target-to-product cross section ratio is increased considerably and the yield of Pu-238 per neutron captured in Np-237 can be substantially improved for long irradiations.

In carrying out the irradiation process one may utilize a number of target configurations as shown in FIGURES 2, 3, 4, 5, 6 and 7 whereby the target material 20, e.g. Np-237, is covered by a neutron absorber 22, having a high thermal resonance, thereby being shielded from the thermal neutrons from the neutron source. The targets may be fixed in their position in the reactor, or may be movable, as is naturally the case with control rods.

Since the principal Np resonance occurs at 0.5 electron volt (e.v.), the shielding of the target from thermal neutrons must be accomplished by use of a neutron absorber material having a high resonance cross section for thermal neutrons. Preferably, this resonance cross section decreases sharply between 0.1 and 0.5 e.v. so as not to decrease unnecessarily or excessively the capture of epithermal neutrons in the target. Gadolinium, samarium, lutetium, cadmium and mixtures thereof are examples of thermal neutron resonance absorber candidates suitable for use in the present process. More specifically, the particular isotopes Gd-155, Lu-176, Gd-157, Sm-149 and Cd-113 are especially useful for this purpose.

In some cases, care must be exercised in selecting and establishing the thickness of shielding materials employed in the practice of this invention. Consider, for example, an irradiation performed under such conditions that the integrated thermal neutron current to which each side of a thermally opaque target would be subjected during the irradiation would be approximately $3 \times 10^{20}$ neutrons cm.$^2$. In order to accommodate such an irradiation and still provide for thermal blackness, i.e. substantially complete shielding of the product and target from thermal neutrons, at the conclusion of the irradiation, required surface densities on each side of the target for cadmium, samarium and gadolinium would be on the order of $3.7 \times 10^{21}$, $2.7 \times 10^{21}$, and $1.1 \times 10^{21}$ atoms/cm.$^2$ respectively. Such a concentration of cadmium would also provide for the removal of approximately 50% of the 0.4 e.v. neutrons, 30% of the 0.5 e.v. neutrons, and 21% of the 0.6 e.v. neutrons impinging upon the target; the required thickness of samarium would provide for the removal of approximately 28%, 22%, and 21% of these particular energy neutrons respectively; in the case of gadolinium, the removal of neutrons of 0.4, 0.5, and 0.6 e.v. would be 20%, 12%, and 8%. Since neutrons of these energies are of principal importance in effecting the conversion of Np-237 to Pu-238, one should avoid using much larger quantities of shielding material than are necessary to perform the shielding function with certainty over the duration of the irradiation. Furthermore, it will be noted that if large targets are used, the neutron flux may not be constant over the entire geometry of the target. Therefore, if a uniform layer of shielding material is employed, some portions of the target will most conveniently be more heavily shielded than necessary in order to provide for adequate protection of those portions of the target which are exposed to higher thermal fluxes.

Similarly, if the integrated thermal flux to which the target is exposed were considerably more or considerably less than set forth herein, the proper quantity of shielding material to be used would be approximately greater or less so as to provide the target with effective opacity for thermal neutrons throughout the life of the irradiation; particularly where the epithermal flux is very high, the basis of choosing between shielding materials may change. For example, if the epithermal flux were high, and the maximum integrated thermal current were only $10^{20}$ n/cm.$^2$-sec., the amount of thermal neutron shielding material needed is decreased, as is the coincident shielding of the first Np resonance; also, the burnup of Sm and Gd due to the capture of epithermal neutrons would become appreciable.

In designing the thickness of shielding material, allowance must be made for the fact that, particularly in very hard spectrum reactors, the thermal flux may be expected to increase significantly as fuel is consumed in the core during the course of the irradiation. Further, the present invention is best practiced by observing with due regard considerations of neutron economy and conversion efficiency in the establishment of target thickness and proper irradiation field. As can be seen by further reference to Table II, the effective cross section of the more important Np-237 resonances is a rather sensitive inverse function of the target thickness. Of course, the higher the effective epithermal resonance cross section of the target, the higher is the ratio of target-to-product cross section and the greater is the rate of conversion of target to product in a given flux. However, if all the thermal neutrons impinging upon the target are parasitically captured by the shield, reasonable neutron economy requires that there also be (1) an appreciable number of resonance energy neutrons available for capture in the target, and (2) a significant fraction of those neutrons must be captured in the target to provide for the constructive capture, to convert target into product, of a reasonable fraction of all the neutrons captured.

To illustrate, if a target containing 0.05 gm./cm.$^2$ of exterior target surface were covered by cadmium, for example, and irradiated in a well moderated reactor such as the MTR, although the target-to-product cross section ratio would be high, as desired to enhance the yield of product in terms of target consumption only about 0.015 neutron would be captured by Np-237 for every neutron absorbed in the cadmium. If, however, the target nuclide thickness were 0.3 gm. of Np-237 per cm.$^2$, for example, although the effective target to product cross section ratio would be somewhat lower, the estimated yield would be improved to about 0.04 atom of product per neutron absorbed. Furthermore, if the irradiations were performed in a reactor with a much harder spectrum, yields could be raised to the order of 0.5 atom of product per neutron captured.

Another factor which makes the irradiation of shielded Np-237 in reactors with very soft spectra less than optimum is the fact that removal of thermal neutrons from the reaction greatly reduces the effective target cross section. Specifically, the effective cross section of an unshielded Np-237 target, 0.3 gm./cm.$^2$ in thickness, in an MTR spectrum would be about 190 barns vs. about 540 barns for Pu-238. Although the target-to-product cross section ratio would be improved markedly by shielding the target with a thermal resonance absorber, the effective cross section of the Np would be decreased drastically (to about 20 barns) requiring a detrimentally long irradiation time to produce a given degree of conversion. On the other extreme, the shielding of thermal neutrons in an irradiation of the same target performed in a highly epithermal flux would provide for only a modest decrease, say on the order of 10% to 20%, in effective target cross section, so that the rate of conversion would not be seriously effected.

Summarizing the considerations discussed immediately hereinbefore, the shielding technique of the present invention may be practiced in any neutron environment; but in order for its use to be constructive to the production of radioisotopes it must be practiced in a neutron environment wherein the flux of resonance energy neutrons is appreciable. In the Yankee Reactor at Rowe, Massachusetts, using the 1962 core as referred to previously, the resonance energy flux between 0.3 e.v. and 100 e.v. is approximately 2.5 times 10$^{13}$ neutrons per cm.$^2$-sec. and this level represents a reasonable lower limit on the resonance energy flux in which it would be practical to practice the present invention. With regard to target surface density, further reference to Table II above shows that in general, there is not much to be gained in self-shielding by operating below 0.1 gm./cm.$^2$ and accordingly this value represents a practical limit below which it is not considered desirable to practice the present inventive process.

The partial shielding of target Np-237 to substantially prevent further transmutation of the product to Pu-239 in the present process for preparing Pu-238 is also beneficial for preventing the loss of product due to fissioning of the Np-238 intermediate. As previously noted, Np-238 has a short half life and a very high thermal cross section, presumably because of a near thermal energy resonance. Being a heavy atom with an odd number of both neutrons and protons, Np-238 can also be expected to have several significant epithermal resonances. Depending upon the location of the epithermal resonances in Np-238, their importance, and other details of the irradiation, it may be desirable and possible also to shield one or more of the Np-238 resonances by choice of absorber or the use of appropriate additional absorbers having resonances coinciding with those of Np-238.

Insofar as the prevention of thermal neutron captures is concerned, the shielding of the Ra-226—Ac227 system requires the consideration of similar problems and principles as shown for the Np-237—Pu-238 example, since the resonance for Ra-226 is also at approximately 0.5 e.v., and because AC-227 also has a high thermal cross section. However, although its resonance parameters have not yet been resolved, it is highly probable that Ac-227 has more important neutron capture resonances at lower epithermal energies than does Pu-238 so that if the relative effective cross section of Ra with respect to that of Ac-227 is to be increased to an optimum degree, it may be desirable and practical to shield the target from neutrons of other energies in addition to those of thermal energy. If one of the Ac-227 resonances coincides with the Ra-226 resonances at 0.54 e.v., it would be detrimental to efficient processing to attempt to shield it from neutrons of that energy. If, however, one of the important resonances is at 0.9 e.v., or at 8 e.v., for example, the use of samarium could serve to shield not only against the capture of thermal neutrons but also against the capture of neutrons in the 0.9 e.v. (and 8 e.v.) regions. Similarly, if there is a principal resonance between 1.1 and 1.4 e.v., Rh-103 would make an effective shielding material in conjunction with a thermal absorber; Ag is an effective scavenger for 5 to 5.5 e.v. neutrons; indium will remove 1.2 to 1.7 e.v. neutrons; Ho and Tm are suitable for use at 4 e.v.; gold can be employed at 5 e.v.; and Hf is effective at 1.2, 2.4, and 8 e.v., for example.

Another application of the present invention is in the production of Au-198, an isotope with a half life of 2.7 days. As shown in Table I, presented hereinbefore, Au-197 has a modest thermal cross section and a number of effective resonances, the most substantial of which is at 5 e.v.; Au-198, on the other hand, has an extremely high thermal cross section, presumably due to a resonance at or near thermal energy. For some applications it is desirable to provide radioactive gold with a high specific activity of Au-198 while limiting the Au-199 content. Using only prior art, these two goals are mutually incompatible, since the highest achievable specific activity would be at equilibrium as the result of irradiation in a high neutron flux, a practice which would also maximize the Au-199 content. By practicing the teachings of the present inventive process, the thermal resonance of Au-198 could be shielded by a thermal resonance absorber such as cadmium, samarium, or gadolinium, while still leaving Au-197 with a substantial cross section due to the resonance at 5 e.v. This is particularly true if the irradiation were to be performed in a reasonably hard spectrum. Au-198, being an odd-odd isotope, may have other effective resonances in the lower e.v. region, but due to the short half life of Au-198, any epithermal resonances would have to be extremely important to make the shielding of one or more of these also desirable. In any event, by shielding appropriate resonances in gold to substantially decrease neutron captures in Au-198, it is possible to produce high specific activity Au-198 with a Au-199 content substantially decreased from that which would occur if the irradiation were to be performed using only prior art.

Similarly, if one wished to produce the isotope TA-182 with high specific activity, by the irradiation of TA-181, one ordinarily would encounter a problem due to the very high thermal cross section of the product. Again, the target has a large number of effective resonances in the epithermal region, so that product transmutation can be limited substantially, without great adverse effect upon target conversion, by irradiating normal tantalum in a reasonably hard neutron flux spectrum while at the same time shielding the target from thermal neutron bombardment by covering the target with a thermal resonance absorber. Being an odd-odd isotope, Ta-182, as in the case of Au-198, can be expected to have other important resonances in the near thermal energy region; and it may be desirable also to shield the target material with nuclides having resonances corresponding to other Ta-182 resonances which are important.

To illustrate further the practicality of the present invention it should be pointed out that the geometry of the target is not critical but rather can be adapted to suit the shape and dimensions of a convenient irradiation environment. This is exemplified, but not limited, by the representative geometrical configurations shown in FIGURES 2 to 7.

In these illustrative configurations, as well as others, it is to be understood that the target isotope can be in elemental form, in the form of a suitable chemical compound alloyed or otherwise mixed with other suitable materials. Similarly, shielding nuclides may be incorporated with other materials as necessary or desirable to facilitate the fabrication, irradiation and processing of the target.

In FIGURE 2, a target material 20 is in the shape of a plate. In this embodiment this target material is shown as being shielded on both sides by similarly shaped resonance absorbing nuclide materials 22. Alternatively, the composite of target 20 and shielding nuclides 22, if desired, can be encased in a suitable cladding material 24, for corrosion protection, structural support or the like.

In FIGURE 3, the target material 20 is in the form of a tube having its outer surface covered with a shielding resonance absorbing nuclide material 22. In turn, if desired, this laminate also can be covered with a protective and strength imparting cladding material 24. In this embodiment, wherein the inner wall of the tube shaped target material 20 defines the interior volume 26 of the tube, neutrons impinging upon the target nuclides 20 from within the space 26 of the tube necessarily have come from outside the target and therefore already have been subjected to capture by shielding nuclides 22. Therefore, the use of a layer of shielding nuclides 22, on the inside face of the target 20, is needed only if it is determined that a harmful number of neutrons penetrating into the enclosed space or environment 26 are reduced to undesirable energies as the result of scattering interactions with nuclides present in this space. To illustrate, a layer of shielding nuclides 22 on the inner wall of tubular target 20 most likely would be required if liquid $H_2O$ fills the space 26. On the other hand, if space 26 is filled with $D_2O$ the need for the inner wall shielding 22 is somewhat reduced; it is highly improbable the inner shielding 22 is needed if space 26 is filled with molten sodium, helium gas, carbon dioxide or low density steam.

FIGURE 4 shows another embodiment of the tubular target assembly of FIGURE 3 wherein the hollow interior 26 of this latter design has been filled with a solid material 28 capable of rescattering into the resonance energy region, a portion of the neutrons which penetrate both the outer shielding nuclide layer 22 and the tubular target 20. Use of $ZrO_2$, for example, as the solid filler 28, because of its oxygen content provides for a mild slowing down effect on neutrons which have penetrated into the interior of the tubular composite assembly. Beryllium, beryllium oxide, solid hydrides such as zirconium hydride or zirconium deuteride, for example, can be used as the filler 28 if increased neutron slowing down effect is desired. It is to be understood that if desired in this embodiment, optionally, shielding nuclides 22 on the inside target surface and cladding materials 24 on either or both of the inside and outside surfaces also can be used.

FIGURE 5 depicts a substantially rod shaped target in which the target nuclides 20 are intimately mixed with a neutron rescattering material to form a composite target 30. This target is admirably suited to decrease the self-shielding effect of target nuclides. As before, the target composite 30 is protected from exposure to neutrons of undesirable energies by an outer layer of appropriate shielding nuclides 22. Additionally, it may be desirable to incorporate shielding nuclides 22 in the target composite 30 to compete favorably with product nuclides for neutrons of certain energies. Likewise, this assembly can be clad with a suitable cladding material 24 if desired. Further consideration of the embodiment shown in FIGURE 5 leads to another application of the present inventive process.

If the scattering nuclide 22 employed in the embodiment of the composite target 30 is, for example, beryllium and the target material 20 is, for example, neptunium, it should be possible to produce directly as the result of an irradiation, a Pu-238—beryllium neutron source by mixing Np-237 with beryllium and incorporating the mixture in an encapsulated target such as that shown in FIGURE 5 for irradiation in a nuclear reactor, following which the composite target 30 could be removed from the irradiation field and used directly as a neutron source. For the economical production of such a source in this manner it would be necessary to convert a substantial fraction of the neptunium originally incorporated into the target 30 to Pu-238, and to prevent the excessive transmutation of Pu-238 and fission of Pu-239 and Np-238 as provided for by practice of the present invention. It may be preferable, for this purpose, to encapsulate the target composite 30 in a cladding material 24 and place the so-encapsulated target within a sleeve 32 containing the shielding nuclides 22 for the irradiation as shown in FIGURE 6. Similarly, already fabricated Ra–Be sources could be upgraded in their activity by neutron irradiation to convert a portion of the Ra-226 contained to Ac-227. Here it would be desirable to prevent, as much as possible, the further transmutation of Ac-227 to Th-228, as by practice of the present invention, in order to keep the source from becoming excessively radioactive in terms of gamma emissions.

In all these cases, it may be necessary or desirable to reencapsulate before marketing or using an irradiated source so as to provide the irradiated source with a surface that has not been exposed to neutron bombardment.

An approach to homogeneity in the mixing of target and rescattering nuclides is shown in FIGURE 7. The target isotopes 20, suitably encased and supported, are surrounded by a suitable solid or liquid rescattering medium 28, and protected from exposure to external neutrons of undesirable energies by a layer of shielding nuclides 22, with internal shielding protection 22, being optional. Alternatively the whole assembly can be contained in a cladding sheath 24.

Various modifications can be made in the present invention without departing from the spirit or scope thereof for it is understood that we limit ourselves only as defined in the appended claims.

We claim:

1. A process for producing in good yield, a product radioisotope, which is the result of one neutron absorption capture in a target radioisotope having a thermal neutron cross section lower than that of the product isotope, which comprises:

(a) Incorporating the target isotope in an irradiation device wherein the surface density of said target isotope is at least 0.1 gram per $cm.^2$;

(b) Shielding of said target isotope from exposure to thermal neutrons by incorporating, peripheral to said target isotope, nuclide material having a high thermal neutron cross section by virtue of a neutron interaction resonance peaking at a neutron energy below 0.3 e.v.;

(c) Irradiating said target isotope in a neutrol environment wherein the neutron flux between 0.3 e.v. and 100 e.v. is in excess of $2.5 \times 10^{13}$ neutrons per cm.$^2$-sec.; and (d) Separating and recovering of target and product isotopes by chemical processing.

2. A process as defined in claim 1 wherein the target isotope is Np-237 and the irradiation is performed until at least 12% of the Np-237 originally present has been converted.

3. A process as defined in claim 1 wherein the target isotope is Ra-226 and the irradiation is performed until at least 3% of the Ra-226 originally present has been converted.

4. A process as defined in claim 1 wherein the shielding nuclide material is selected from the group consisting of gadolinium, samarium, cadmium, lutetium and mixtures thereof.

5. The process of claim 1, said irradiation device including within its periphery a quantity of inelastic neutron scattering nuclides selected from the group consisting of oxygen, hydrogen, deuterium, beryllium, and carbon.

6. The process as defined in claim 1 and including the step of providing a heterogeneous interspersion of said target isotope and an inelastic neutron scattering material selected from the group consisting of carbon, beryllium, metal oxides, metal hydrides and mixtures thereof.

7. The process as defined in claim 1 and including the step of homogeneously mixing the target isotope material selected from the group consisting of carbon, beryllium, metal oxides, metal hydrides and mixtures thereof.

8. A process for producing α–Be neutron sources which comprises:

(a) intimately mixing with Be a target material selected from the group consisting of Np-237 and Ra-226, (b) encapsulating said mixture and shielding said mixture from exposure to thermal neutrons with a thermal resonance neutron absorber selected from the group comprising Sm, Gd, and Cd, (c) irradiating said shielded encapsulated mixture in a nuclear reactor thereof to convert a predetermined fraction of said target isotope to the product of one neutron capture, and (d) removing and recovering said encapsulated mixture.

References Cited by the Examiner

UNITED STATES PATENTS

| | | | |
|---|---|---|---|
| 2,743,226 | 4/1956 | Newson | 176—15 |
| 2,860,093 | 11/1958 | Wigner et al. | 176—12 |
| 2,975,113 | 3/1961 | Gordon | 176—15 |
| 3,042,598 | 7/1962 | Crowther | 176—10 |
| 3,103,479 | 9/1963 | Ransohoff | 176—86 |

L. DEWAYNE RUTLEDGE, *Primary Examiner.*

CARL D. QUARFORTH, REUBEN EPSTEIN,
*Examiners.*

J. V. MAY, H. E. BEHREND, *Assistant Examiners.*